(12) United States Patent
Eickmann

(10) Patent No.: US 11,046,520 B2
(45) Date of Patent: Jun. 29, 2021

(54) LOG LIFTING DEVICE

(71) Applicant: Joseph Eickmann, Lampe, MO (US)

(72) Inventor: Joseph Eickmann, Lampe, MO (US)

( * ) Notice: Subject to any disclaimer, the term of this patent is extended or adjusted under 35 U.S.C. 154(b) by 86 days.

(21) Appl. No.: 16/538,943

(22) Filed: Aug. 13, 2019

(65) Prior Publication Data

US 2021/0047123 A1 Feb. 18, 2021

(51) Int. Cl.
| | | |
|---|---|---|
| *B65G 7/08* | (2006.01) | |
| *B25G 1/04* | (2006.01) | |
| *B25G 3/02* | (2006.01) | |
| *B66F 15/00* | (2006.01) | |
| *B27B 17/00* | (2006.01) | |

(52) U.S. Cl.
CPC .............. *B65G 7/08* (2013.01); *B25G 1/04* (2013.01); *B25G 3/02* (2013.01); *B66F 15/00* (2013.01); *B27B 17/0075* (2013.01)

(58) Field of Classification Search
CPC .. B27B 21/00; B65G 7/02; B65G 7/08; B66F 15/00; B25G 3/02; B25G 1/04
USPC ............. 294/17, 15, 18, 82.17; 254/131, 94; 414/453
See application file for complete search history.

(56) References Cited

U.S. PATENT DOCUMENTS

| | | | | |
|---|---|---|---|---|
| 1,375,751 A | * | 4/1921 | Grannis | B25B 27/00 |
| | | | | 254/25 |
| 1,821,041 A | * | 9/1931 | Turner | E01B 29/26 |
| | | | | 254/27 |
| 2,520,427 A | * | 8/1950 | Nelson | E04G 23/08 |
| | | | | 254/131 |
| 2,693,935 A | | 11/1954 | Halbert | |
| 2,718,375 A | | 9/1955 | Purdy | |
| 3,049,337 A | * | 8/1962 | Griggs | E04G 23/08 |
| | | | | 254/131 |
| 4,240,657 A | | 12/1980 | Feighery | |
| D258,487 S | | 3/1981 | Brugger | |
| 4,368,874 A | | 1/1983 | Weisgerber | |
| 4,375,935 A | | 3/1983 | Miller | |
| 4,793,646 A | * | 12/1988 | Michaud, Jr. | B63B 21/54 |
| | | | | 114/221 R |
| 5,174,549 A | | 12/1992 | Driver | |
| 6,644,627 B1 | * | 11/2003 | Forrester | B66F 15/00 |
| | | | | 254/131 |
| 6,964,442 B1 | | 11/2005 | Radcliff | |
| 8,342,482 B2 | * | 1/2013 | Smith | B66F 15/00 |
| | | | | 254/25 |
| 8,708,312 B2 | * | 4/2014 | Stawarski | B25G 1/06 |
| | | | | 254/129 |
| 10,259,108 B2 | * | 4/2019 | Duncan | B25G 3/36 |
| D887,810 S | * | 6/2020 | Su | D8/89 |

(Continued)

*Primary Examiner* — Paul T Chin

(57) ABSTRACT

A log lifting device for raising a log into a cutting position includes a cylinder, a handle, and a wedge. The handle is coupled to and extends from the cylinder equally distant from opposing ends of the cylinder. The wedge is coupled to and extends from the cylinder proximate to the handle. The wedge is substantially perpendicular to the handle. The wedge is configured to be positioned beneath a felled log, positioning a user to grasp and pull on the handle to rotate the cylinder to apply a lifting force to the log so that the log is supported upon the handle above a surface. The log thus is positioned to be safely cut by the user using a chain saw, or other log cutting implement.

16 Claims, 6 Drawing Sheets

(56) References Cited

U.S. PATENT DOCUMENTS

| | | | |
|---|---|---|---|
| 2010/0140576 A1* | 6/2010 | Hung | B66F 17/00 254/93 R |
| 2010/0208081 A1* | 8/2010 | Tokutake | H04N 7/014 348/189 |
| 2010/0244474 A1 | 9/2010 | Komely | |
| 2016/0023873 A1* | 1/2016 | Kasan | E04G 23/08 254/131.5 |

* cited by examiner

LOG LIFTING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to lifting devices and more particularly pertains to a new lifting device for raising a log into a cutting position.

(2) Description of Related Art Including Information Disclosed Under 37 CFR 1.97 and 1.98

The prior art relates to lifting devices.

BRIEF SUMMARY OF THE INVENTION

An embodiment of the disclosure meets the needs presented above by generally comprising a cylinder, a handle, and a wedge. The handle is coupled to and extends from the cylinder equally distant from opposing ends of the cylinder. The wedge is coupled to and extends from the cylinder proximate to the handle. The wedge is substantially perpendicular to the handle. The wedge is configured to be positioned beneath a felled log, positioning a user to grasp and pull on the handle to rotate the cylinder to apply a lifting force to the log so that the log is supported upon the handle above a surface. The log thus is positioned to be safely cut by the user using a chain saw, or other log cutting implement.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
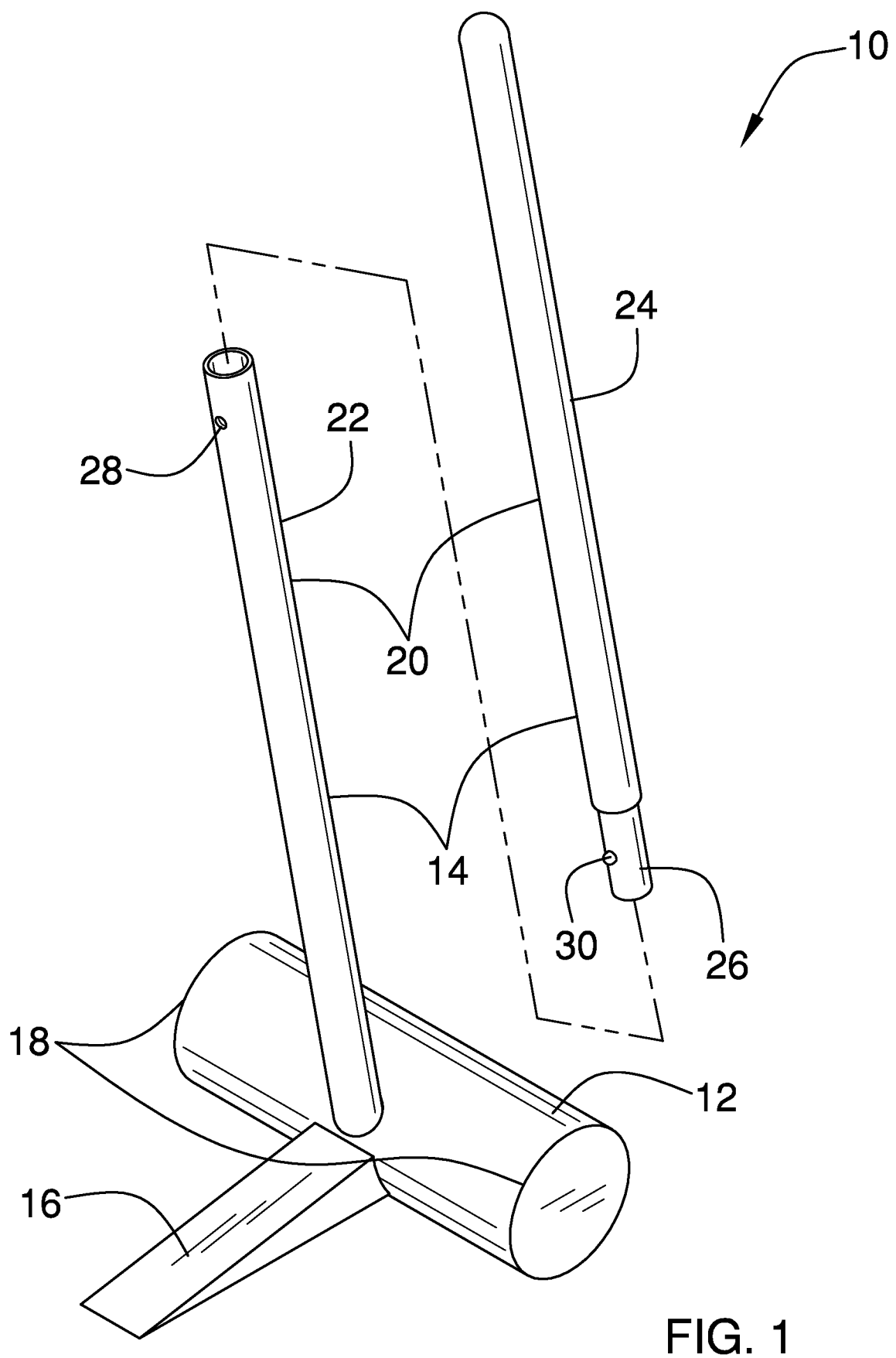
FIG. 1 is an isometric perspective view of a log lifting device according to an embodiment of the disclosure.
Figure 2:
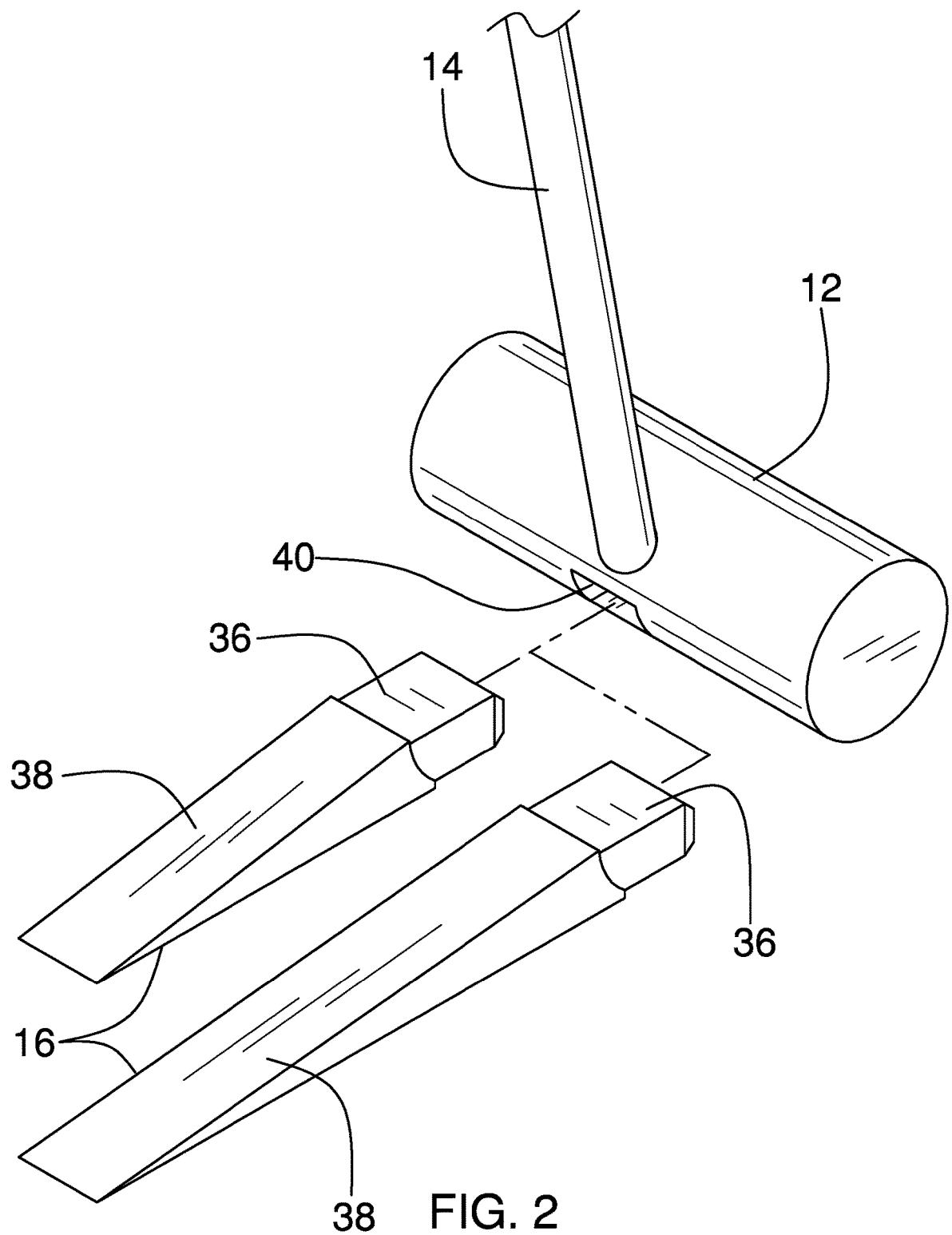
FIG. 2 is a detail view of an embodiment of the disclosure.

With reference now to the drawings, and in particular to FIGS. 1 through 6 thereof, a new lifting device embodying the principles and concepts of an embodiment of the disclosure and generally designated by the reference numeral 10 will be described.

Figure 6:
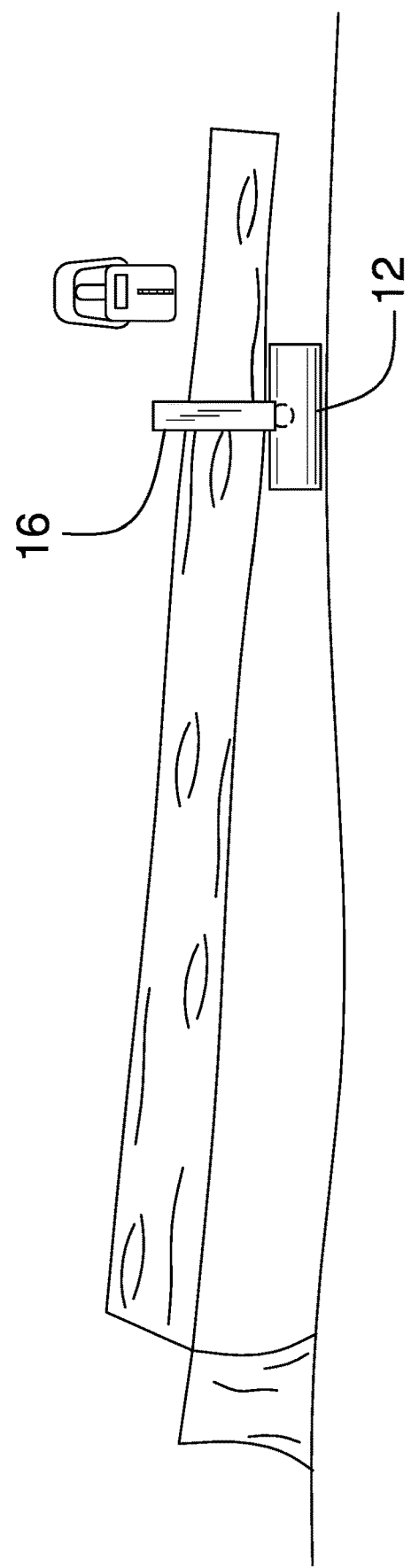
FIG. 6 is an in-use view of an embodiment of the disclosure.

As best illustrated in FIGS. 1 through 6, the log lifting device 10 generally comprises a cylinder 12, a handle 14, and a wedge 16. The handle 14 is coupled to and extends from the cylinder 12 equally distant from opposing ends 18 of the cylinder 12. The wedge 16 is coupled to and extends from the cylinder 12 proximate to the handle 14. The wedge 16 is substantially perpendicular to the handle 14. The wedge 16 is configured to be positioned beneath a felled log, positioning a user to grasp and pull on the handle 14 to rotate the cylinder 12 to apply a lifting force to the log so that the log is supported upon the handle 14 above a surface, as shown in FIG. 6. The log thus is positioned to be safely cut by the user using a chain saw, or other log cutting implement. The lifting of the log for cutting is safer for the user than cutting the log while it is on the ground.

The cylinder 12 may be hollow so as to reduce the overall mass of the device 10. The opposing ends 18 of the cylinder 12 may be separated by from 40.0 to 80.0 centimeters. The opposing ends 18 are separated by 61.0 centimeters. The handle 14 may have a length of from 100.0 to 200.0 centimeters. The handle 14 has a length of 152.4 centimeters. The handle 14 may be circularly shaped when viewed longitudinally.

The handle 14 comprises a plurality sections 20, as shown in FIG. 1, which are selectively couplable so that the handle 14 is selectively length selectable. The plurality of sections 20 may comprise a first section 22 that is coupled to the cylinder 12 and a second section 24 that is selectively couplable to the first section 22. The plurality of sections 20 also may comprise more than two sections 20. The first section 22 and the second section 24 may be of substantially equally length. The handle 14 may be tubular so as to reduce the overall mass of the device 10. The second section 24 has a terminal segment 26 that is circumferentially smaller than the first section 22, as shown in FIG. 1, so that the terminal segment 26 is selectively insertable into the first section 22.

Figure 3:
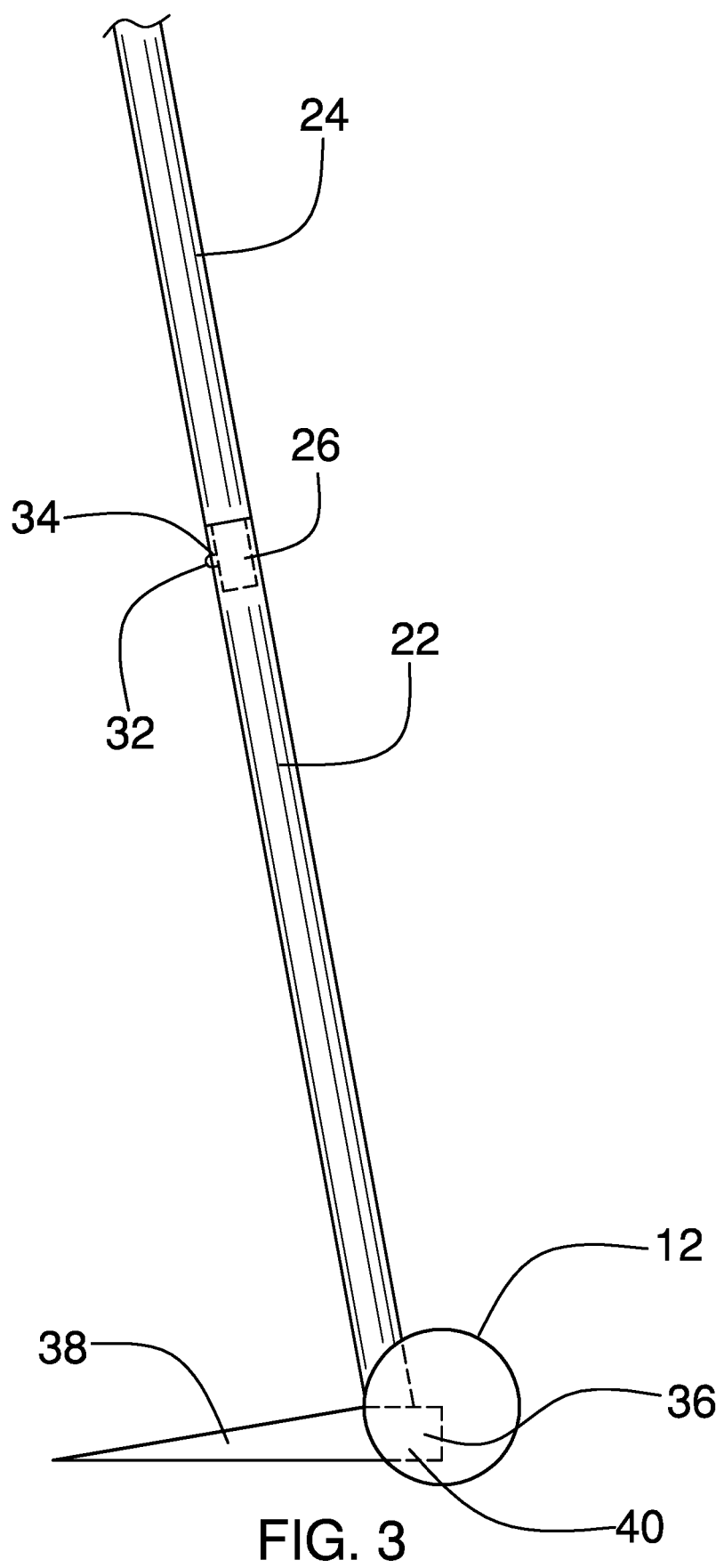
FIG. 3 is a side view of an embodiment of the disclosure.
Figure 4:
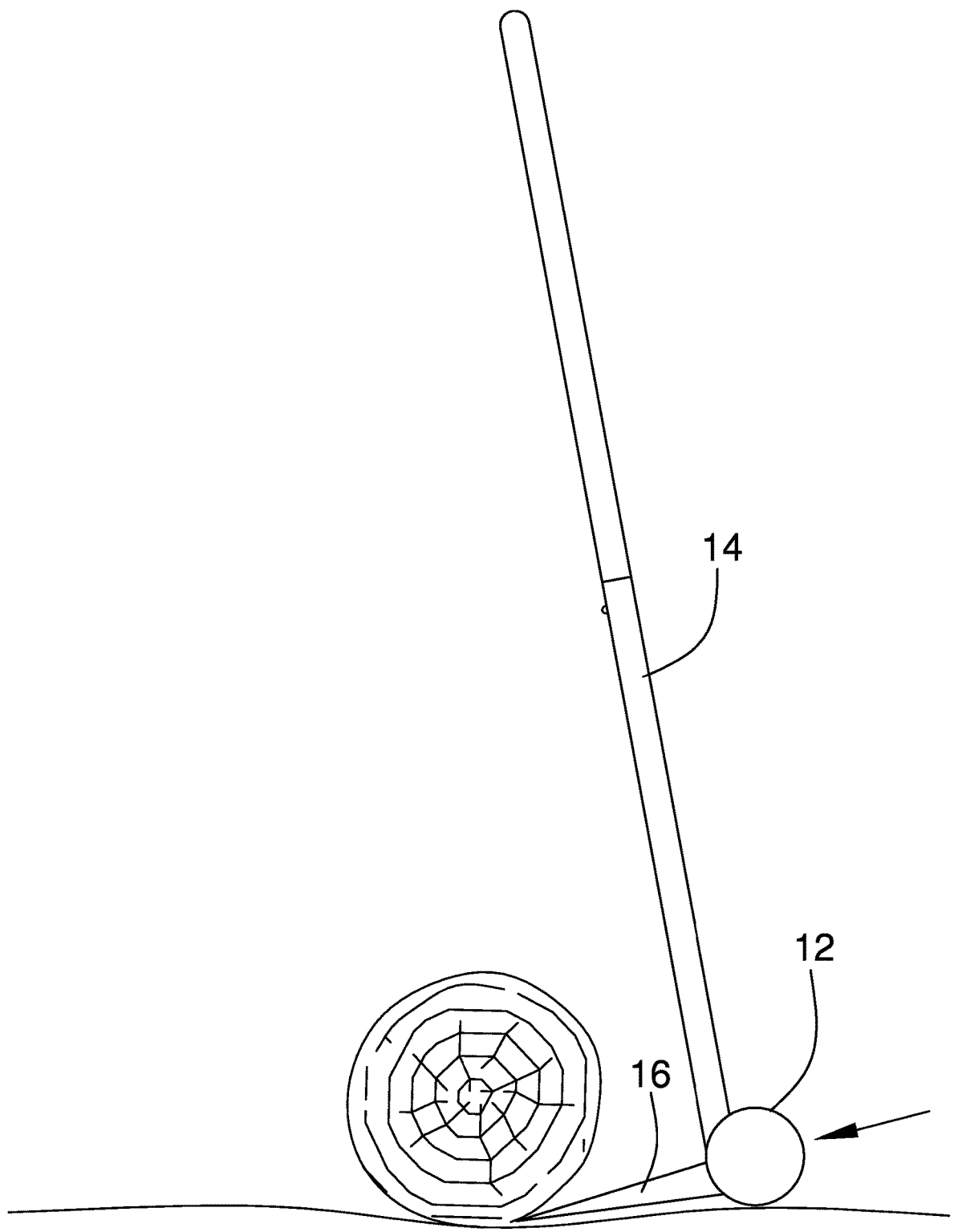
FIG. 4 is an in-use view of an embodiment of the disclosure.
Figure 5:
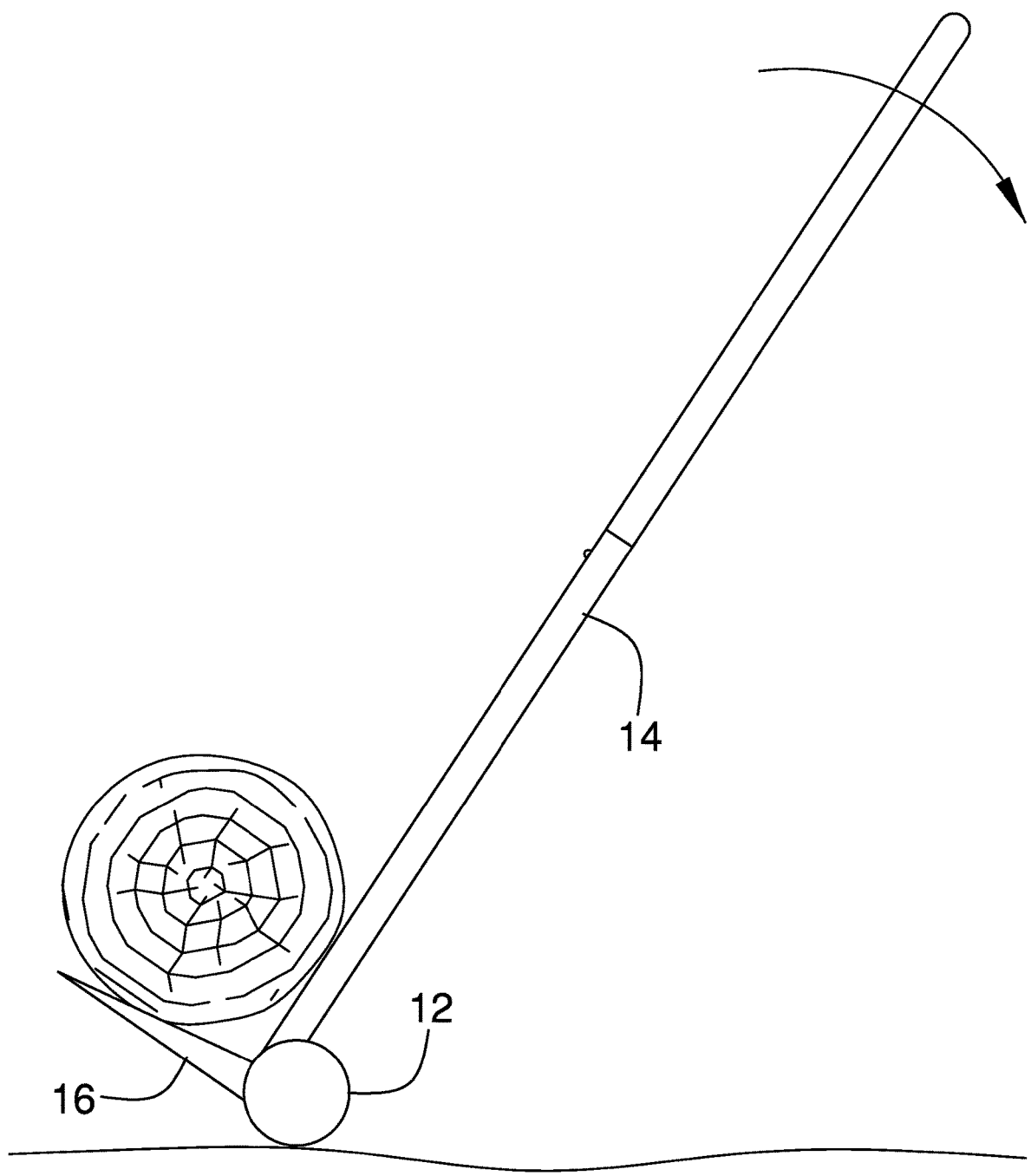
FIG. 5 is an in-use view of an embodiment of the disclosure.

A set of first fasteners 28 is coupled to the first section 22 distal from the cylinder 12. A set of second fasteners 30 is coupled to the second section 24 so that each second fastener 30 is positioned to couple to a respective first fastener 28 to couple the second section 24 of the handle 14 to the first section 22 of the handle 14. The second fastener 30 may comprise a pin 32 that is spring loaded, as shown in FIG. 3. The first fastener 28 may comprise a hole 34 that is positioned to insert the pin 32 to couple the second section 24 to the first section 22. The device 10 may comprise other fastening means for coupling the first section 22 of the handle 14 to the second section 24 of the handle 14, such as, but not limited to, quick connects, clamp connectors, and the like.

The wedge 16, the handle 14, and the cylinder 12 comprise metal. The wedge 16, the handle 14, and the cylinder 12 may comprise at least one of steel and aluminum, or other metal, such as, but not limited to, titanium and the like.

The wedge 16 may comprise a set of wedges 16. Each wedge 16 comprises a first segment 36 and a second segment 38. The first segment 36 is shaped complementarily to an orifice 40 that is positioned in the cylinder 12. The orifice 40 is positioned to selectively insert the first segment 36 of a respective wedge 16 to removably couple the respective wedge 16 to the cylinder 12.

Each second segment 38 has a respective length so that the set of wedges 16 comprises wedges 16 that have second segments 38 that comprise a variety of lengths. The set of wedges 16 comprises a first wedge 16, which has a second segment 38 that has a length of 25.4 centimeters, and a second wedge 16, which has a second segment 38 that has a length of 38.1 centimeters. The set of wedges 16 also may comprise additional wedges 16 having additional lengths.

In use, the wedge 16 is positioned beneath a felled log. The user then grasps and pulls on the handle 14 to rotate the cylinder 12 to lift the log so that the log is supported upon the handle 14 above a surface. The log thus is positioned to be safely cut by the user using a chain saw, or other log cutting implement.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A log lifting device comprising:
    a cylinder;
    a handle coupled to and extending from the cylinder equally distant from opposing ends of the cylinder; and
    a wedge coupled to and extending from the cylinder proximate to the handle such that the wedge is in a fixed perpendicular orientation relative to the handle wherein the wedge is configured for positioning beneath a felled log positioning a user for grasping and pulling on the handle rotating the cylinder for applying a lifting force to the log such that the log is supported upon the handle above a surface positioning the user for cutting the log, the wedge comprising a first segment and a second segment, the first segment being shaped complementarily to an orifice extending into the cylinder such that the orifice is positioned for selectively inserting the first segment of the wedge for removably coupling the wedge to the cylinder.

2. The device of claim 1, further including the opposing ends of the cylinder separated by from 40.0 to 80.0 centimeters.

3. The device of claim 2, further including the opposing ends of the cylinder separated by 61.0 centimeters.

4. The device of claim 1, further including the handle having a length of from 100.0 to 200.0 centimeters.

5. The device of claim 4, further including the handle having a length of 152.4 centimeters.

6. The device of claim 1, further including the handle being circularly shaped when viewed longitudinally.

7. The device of claim 1, further including the handle comprising a plurality sections, the sections being selectively couplable such that the handle is selectively length selectable.

8. The device of claim 7, further including the plurality of sections comprising a first section coupled to the cylinder and a second section selectively couplable to the first section.

9. The device of claim 8, further including the first section and the second section being of substantially equally length.

10. The device of claim 7, further comprising:
    the second section having a terminal segment, the terminal segment being circumferentially smaller than the first section such that the terminal segment is selectively insertable into the first section;
    a set of first fasteners coupled to the first section distal from the cylinder; and
    a set of second fasteners coupled to the second section such that each second fastener is positioned for coupling to a respective first fastener for coupling the second section of the handle to the first section of the handle.

11. The device of claim 10, further comprising
    the second fastener comprising a pin, the first fastener comprising a hole such that the hole is positioned for inserting the pin for coupling the second section to the first section.

12. The device of claim 1, further including the wedge, the handle, and the cylinder comprising metal.

13. The device of claim 12, further including the wedge, the handle, and the cylinder comprising at least one of steel and aluminum.

14. The device of claim 1, further including the wedge being one of a set of wedges, each second segment having a respective length such that the set of wedges comprises wedges having second segments comprising a variety of lengths.

15. The device of claim 14, further including the set of wedges comprising a first wedge having a second segment having a length of 25.4 centimeters and a second wedge having a second segment having a length of 38.1 centimeters.

16. A log lifting device comprising:
- a cylinder, the cylinder having opposing ends separated by from 40.0 to 80.0 centimeters, the opposing ends separated by 61.0 centimeters;
- a handle coupled to and extending from the cylinder equally distant from the opposing ends of the cylinder, the handle having a length of from 100.0 to 200.0 centimeters, the handle having a length of 152.4 centimeters, the handle being circularly shaped when viewed longitudinally, the handle comprising a plurality sections, the sections being selectively couplable such that the handle is selectively length selectable, the plurality of sections comprising a first section coupled to the cylinder and a second section selectively couplable to the first section, the first section and the second section being of substantially equally length, the second section having a terminal segment, the terminal segment being circumferentially smaller than the first section such that terminal segment is selectively insertable into the first section;
- a set of first fasteners coupled to the first section distal from the cylinder;
- a set of second fasteners coupled to the second section such that each second fastener is positioned for coupling to a respective first fastener for coupling the second section of the handle to the first section of the handle, the second fastener comprising a pin, the first fastener comprising a hole such that the hole is positioned for inserting the pin for coupling the second section to the first section; and
- a wedge coupled to and extending from the cylinder proximate to the handle such that the wedge is in a fixed perpendicular orientation relative to the handle wherein the wedge is configured for positioning beneath a felled log positioning a user for grasping and pulling on the handle rotating the cylinder for applying a lifting force to the log such that the log is supported upon the handle above a surface positioning the user for cutting the log, the wedge comprising a first segment and a second segment, the first segment being shaped complementarily to an orifice extending into the cylinder such that the orifice is positioned for selectively inserting the first segment of the wedge for removably coupling the wedge to the cylinder, the wedge, the handle, and the cylinder comprising metal, the wedge, the handle, and the cylinder comprising at least one of steel and aluminum, the wedge being one of a set of wedges, each second segment having a respective length such that the set of wedges comprises wedges having second segments comprising a variety of lengths, the set of wedges comprising a first wedge having a second segment having a length of 25.4 centimeters and a second wedge having a second segment having a length of 38.1 centimeters.

\* \* \* \* \*